United States Patent
Tanaka et al.

(10) Patent No.: US 11,121,501 B2
(45) Date of Patent: Sep. 14, 2021

(54) CONNECTOR HAVING STRUCTURE FOR SEPARATING CONNECTOR FROM CONNECTION TARGET

(71) Applicant: Yazaki Corporation, Tokyo (JP)

(72) Inventors: Yasuhiro Tanaka, Shizuoka (JP); Hiroki Kitagawa, Shizuoka (JP); Masanobu Higashitani, Shizuoka (JP); Kengo Machida, Shizuoka (JP); Maho Shinohara, Shizuoka (JP); Masatoshi Yamada, Shizuoka (JP); Toshiaki Nozawa, Shizuoka (JP); Noboru Hayasaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/718,143

(22) Filed: Dec. 17, 2019

(65) Prior Publication Data

US 2020/0203882 A1    Jun. 25, 2020

(30) Foreign Application Priority Data

Dec. 20, 2018   (JP) .............................. JP2018-238020

(51) Int. Cl.
*H01R 13/533* (2006.01)
*F16B 35/00* (2006.01)

(52) U.S. Cl.
CPC ......... *H01R 13/533* (2013.01); *F16B 35/005* (2013.01); *H01R 2201/26* (2013.01)

(58) Field of Classification Search
CPC ........... H01R 13/73; H01R 24/28; H01R 4/64
See application file for complete search history.

(56) References Cited

U.S. PATENT DOCUMENTS

| | | | | | |
|---|---|---|---|---|---|
| 6,411,526 | B1* | 6/2002 | Nguyen | ............... | H01R 13/518 220/4.02 |
| 6,951,485 | B2* | 10/2005 | Lin | .................... | H01R 13/6596 361/799 |
| 7,445,498 | B2* | 11/2008 | Tsuo | .................... | H01R 13/748 439/562 |

(Continued)

FOREIGN PATENT DOCUMENTS

| | | |
|---|---|---|
| CN | 207069191 U | 3/2018 |
| DE | 29502029 U1 | 6/1995 |

(Continued)

*Primary Examiner* — Abdullah A Riyami
*Assistant Examiner* — Nader J Alhawamdeh
(74) *Attorney, Agent, or Firm* — Kenealy Vaidya LLP

(57) ABSTRACT

A connector includes a housing member having a fitting part that houses a terminal and is fitted to a counterpart connector provided in a connection target and a fixed part that is fixed to a fixed wall surface of the connection target together with the fitting part in the state in which the fitting part has been fitted to the counterpart connector. The fixed part has through holes, which communicate with fastening holes formed in the fixed wall surface along a fitting direction between the fitting part and the counterpart connector and into which fastening bolts fastened to the fastening holes are inserted along the fitting direction, in the state in which the fitting part has been fitted to the counterpart connector, and a screw hole into which a separation member is screwed.

7 Claims, 10 Drawing Sheets

(56) References Cited

U.S. PATENT DOCUMENTS

| | | | |
|---|---|---|---|
| 8,152,562 B2* | 4/2012 | Gross | H01R 13/741 |
| | | | 439/533 |
| 8,662,920 B2 | 3/2014 | Ishibashi et al. | |
| 10,658,769 B1* | 5/2020 | Shen | H01R 4/64 |
| 2008/0117569 A1* | 5/2008 | Lee | H05K 7/20145 |
| | | | 361/678 |
| 2013/0059466 A1 | 3/2013 | Ishibashi et al. | |
| 2020/0203882 A1* | 6/2020 | Tanaka | H01R 13/6395 |

FOREIGN PATENT DOCUMENTS

| | | |
|---|---|---|
| JP | H5-37165 A | 2/1993 |
| JP | 2010-118226 A | 5/2010 |
| JP | 2013-54929 A | 3/2013 |
| JP | 2016-162484 A | 9/2016 |
| JP | 2018-41635 A | 3/2018 |

* cited by examiner

CONNECTOR HAVING STRUCTURE FOR SEPARATING CONNECTOR FROM CONNECTION TARGET

CROSS-REFERENCE TO RELATED APPLICATION(S)

The present application claims priority to and incorporates by reference the entire contents of Japanese Patent Application No. 2018-238020 filed in Japan on Dec. 20, 2018.

BACKGROUND OF THE INVENTION

1. Field of the Invention

The present invention relates to a connector.

2. Description of the Related Art

Devices such as an inverter and a motor mounted on an electric vehicle or a hybrid vehicle are connected to each other by a connector attached to an end part of an electric wire. The connector is fitted to a counterpart connector provided in a counterpart device and is electrically connected to the counterpart device.

Japanese Patent Application Laid-open No. 2018-41635 discloses a technology related to a shield connector including an electric wire shield shell provided with a bolt holding part, a fitting bolt held by the bolt holding part and screwed to a device connector, and a C-shaped ring attached to the fitting bolt. According to the shield connector of Japanese Patent Application Laid-open No. 2018-41635, in the shield connector in which one connector is fitted to another connector by bolt fastening, smooth separation of both connectors is possible.

However, in the aforementioned connector, it is required that the connectors can be more easily separated from each other.

SUMMARY OF THE INVENTION

An object of the present invention is to provide a connector capable of easily separating connectors from each other.

In order to achieve the above mentioned object, a connector according to one aspect of the present invention includes a housing member having a fitting part that houses a terminal and is fitted to a counterpart connector provided in a connection target and a fixed part that is fixed to a fixed wall surface of the connection target together with the fitting part in a state in which the fitting part has been fitted to the counterpart connector, wherein the fixed part has through holes, that communicate with fastening holes formed in the fixed wall surface along a fitting direction between the fitting part and the counterpart connector and into which fastening bolts fastened to the fastening holes are inserted along the fitting direction, in the state in which the fitting part has been fitted to the counterpart connector, and a screw hole into which a separation member is screwed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a connector according to an embodiment of the present invention will be described in detail with reference to the drawings. It is noted that the invention is not limited to the embodiment. Constituent elements in the following embodiment include those that can be easily arrived at by a person skilled in the art or those that are substantially the same.

Embodiment

Figure 1:
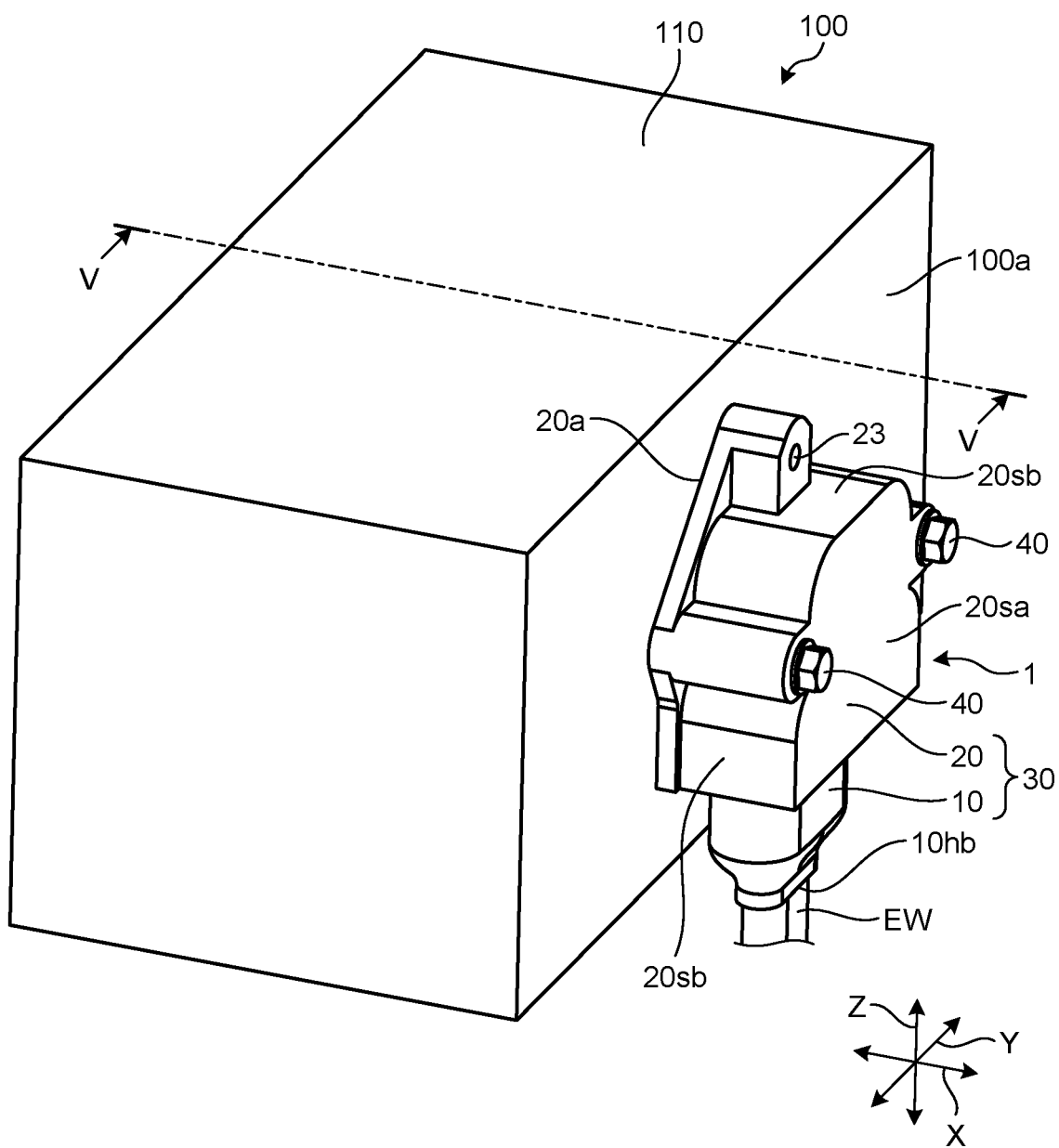
FIG. 1 is a perspective view illustrating a connector according to an embodiment.
Figure 2:
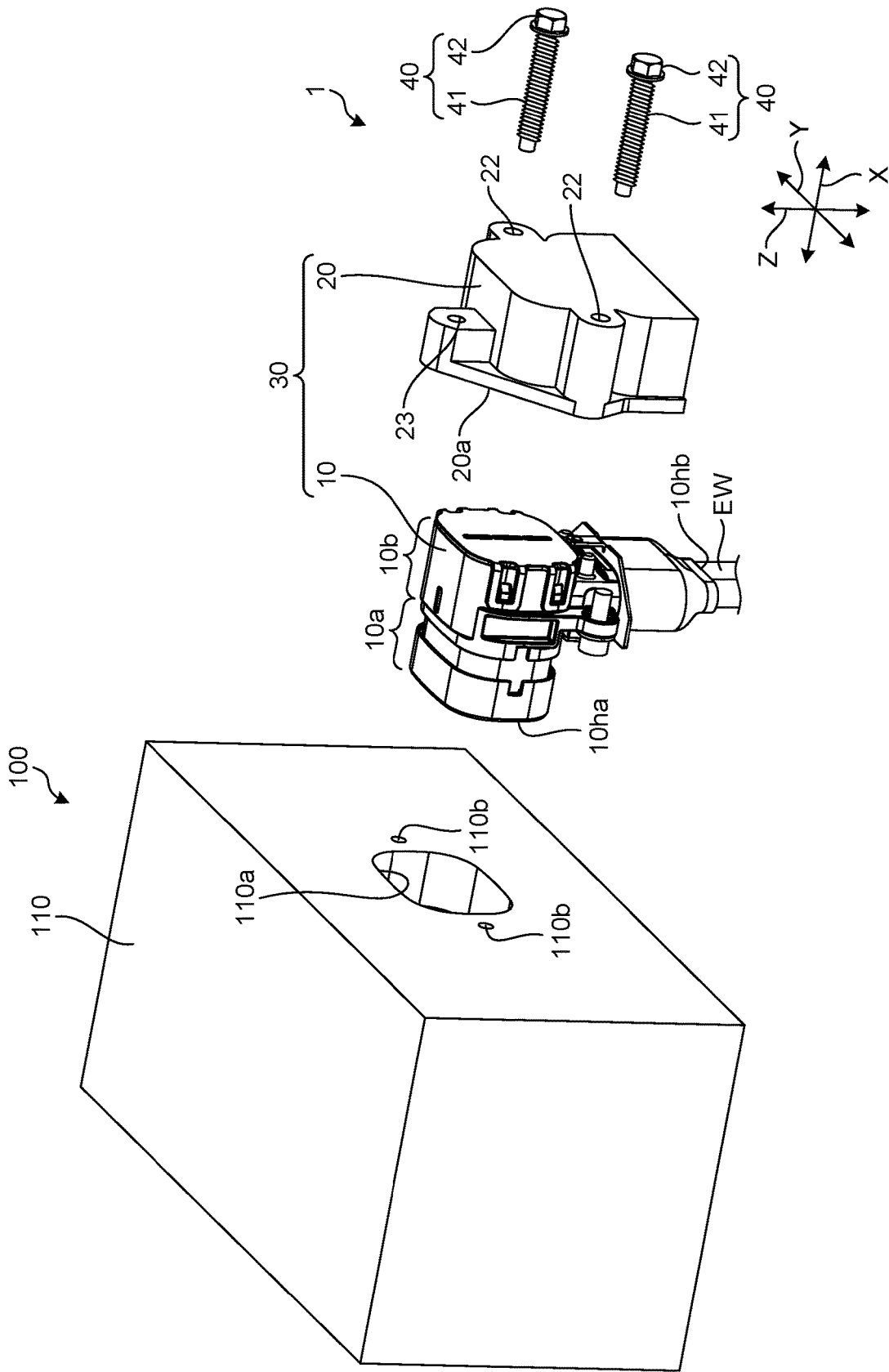
FIG. 2 is an exploded perspective view illustrating the connector according to the embodiment.
Figure 3:
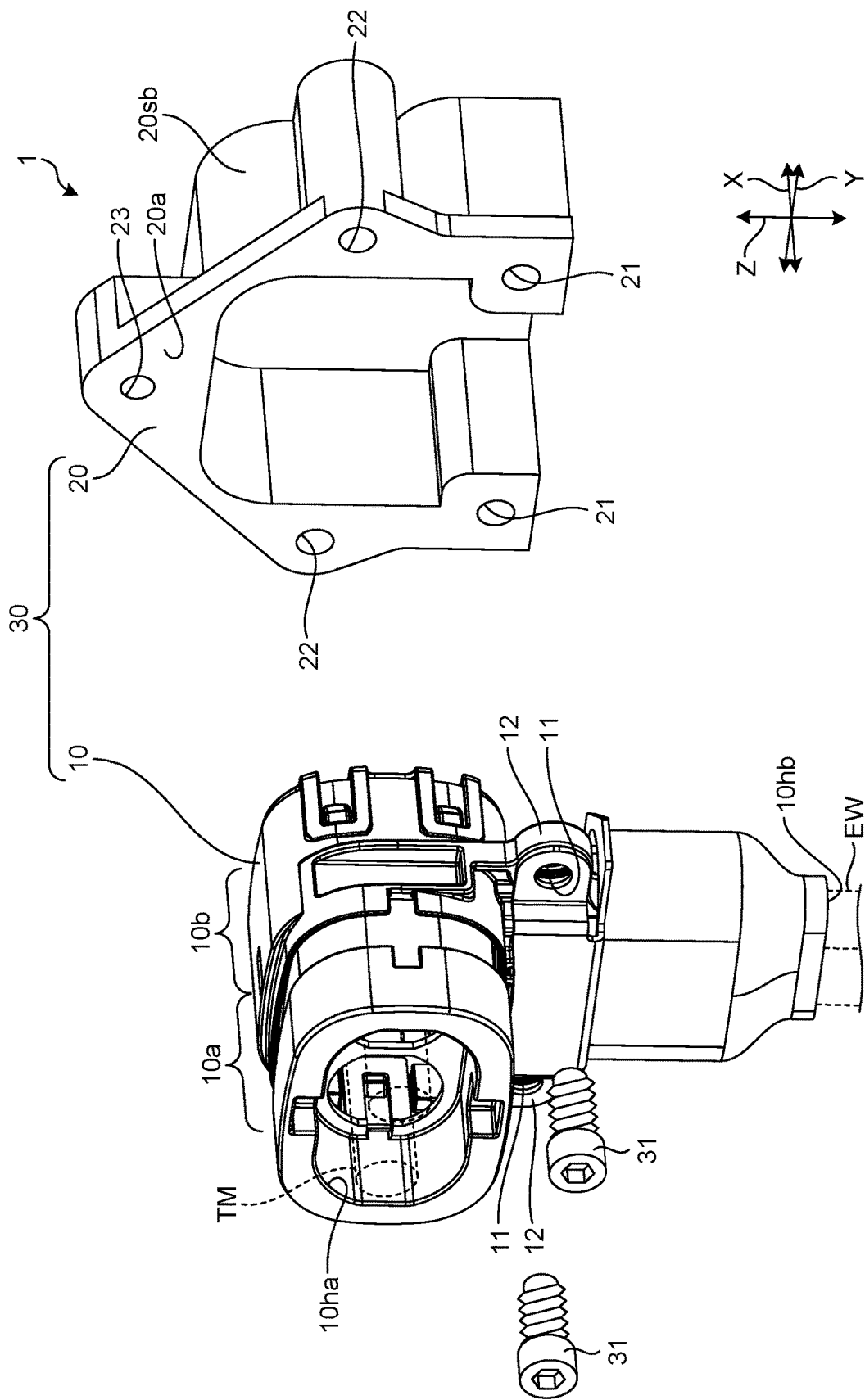
FIG. 3 is an exploded perspective view illustrating the connector according to the embodiment.
Figure 4:
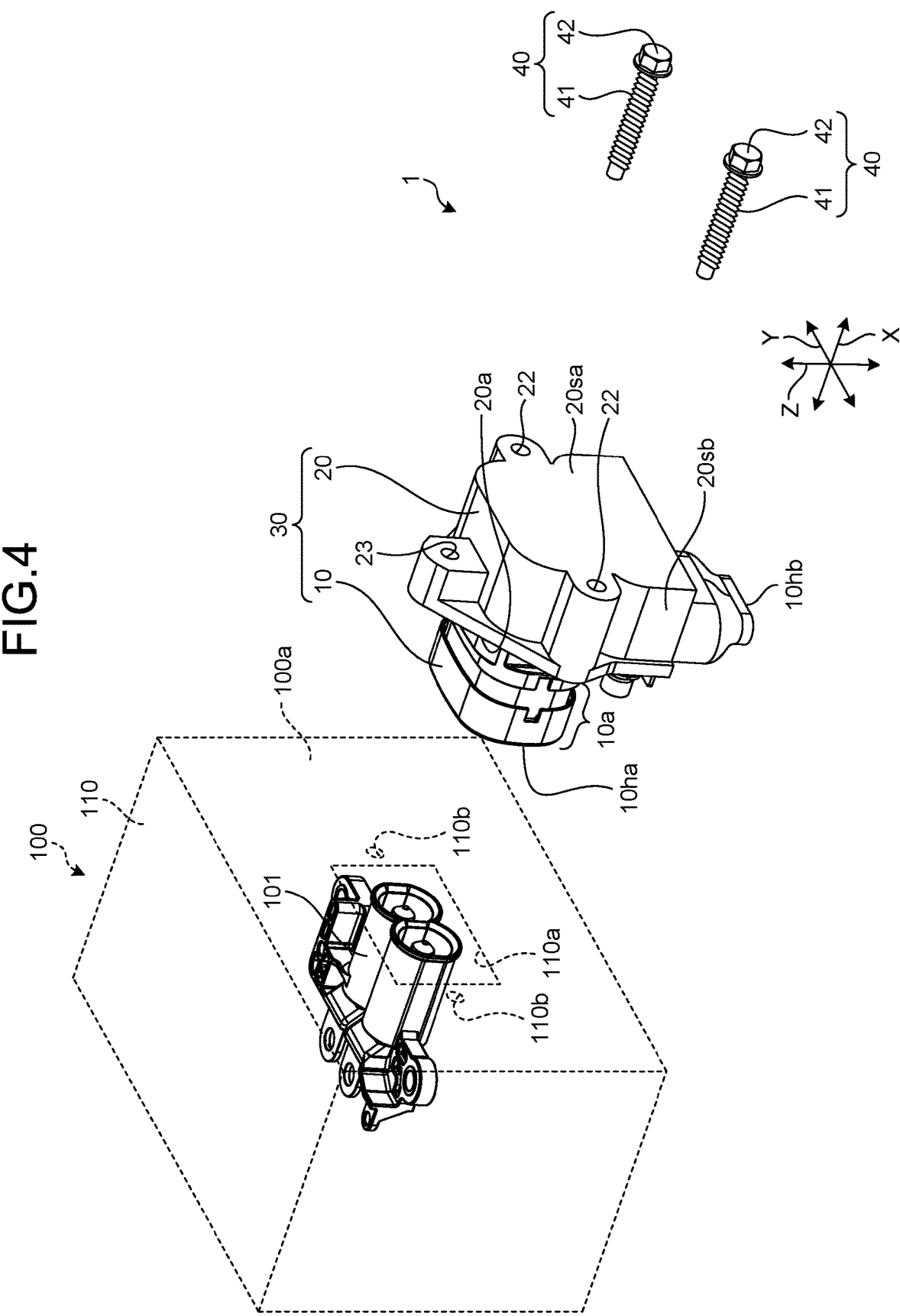
FIG. 4 is a perspective view illustrating the connector according to the embodiment and a counterpart connector.
Figure 5:
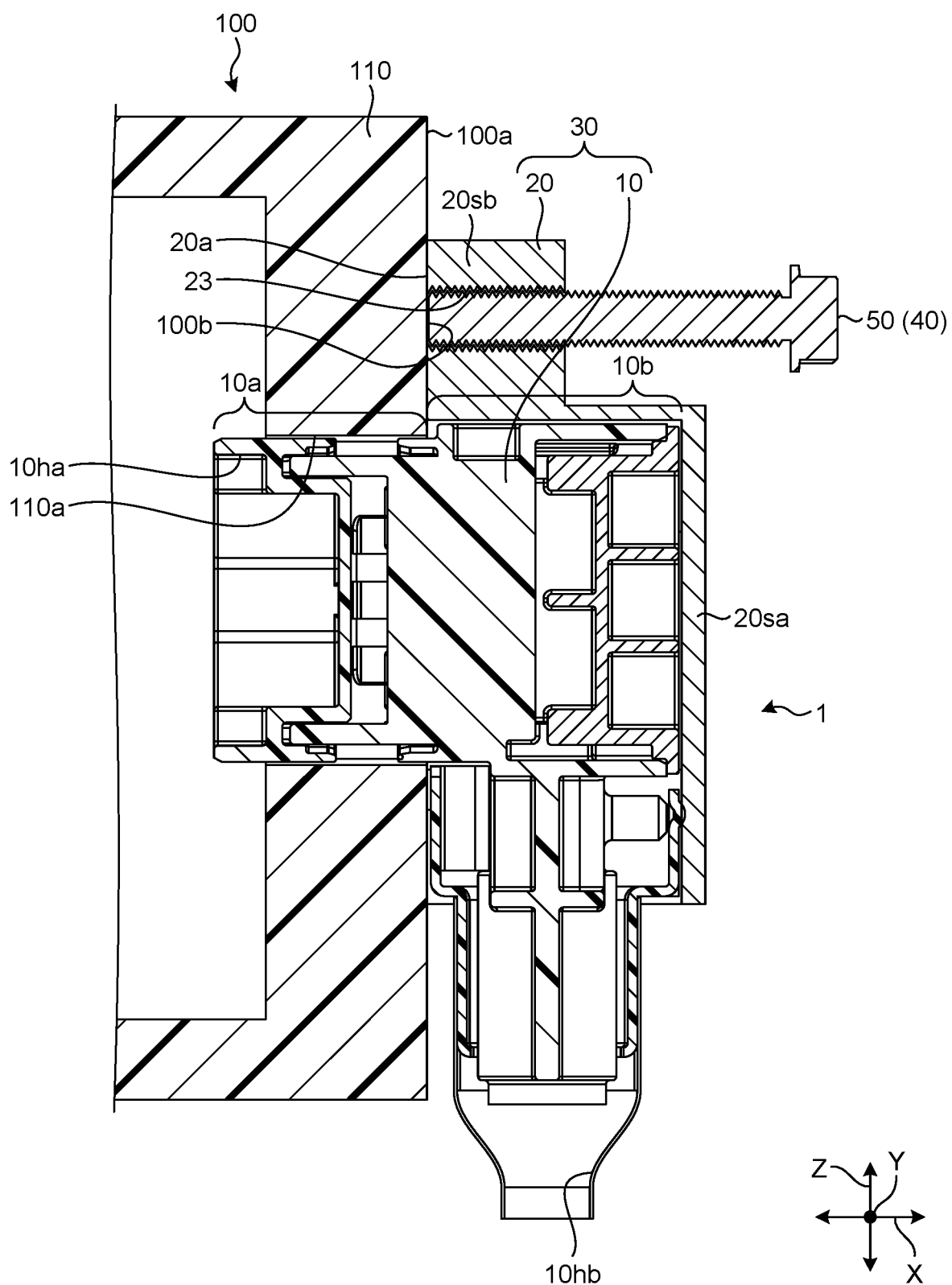
FIG. 5 is a sectional view illustrating the connector according to the embodiment.
Figure 6:
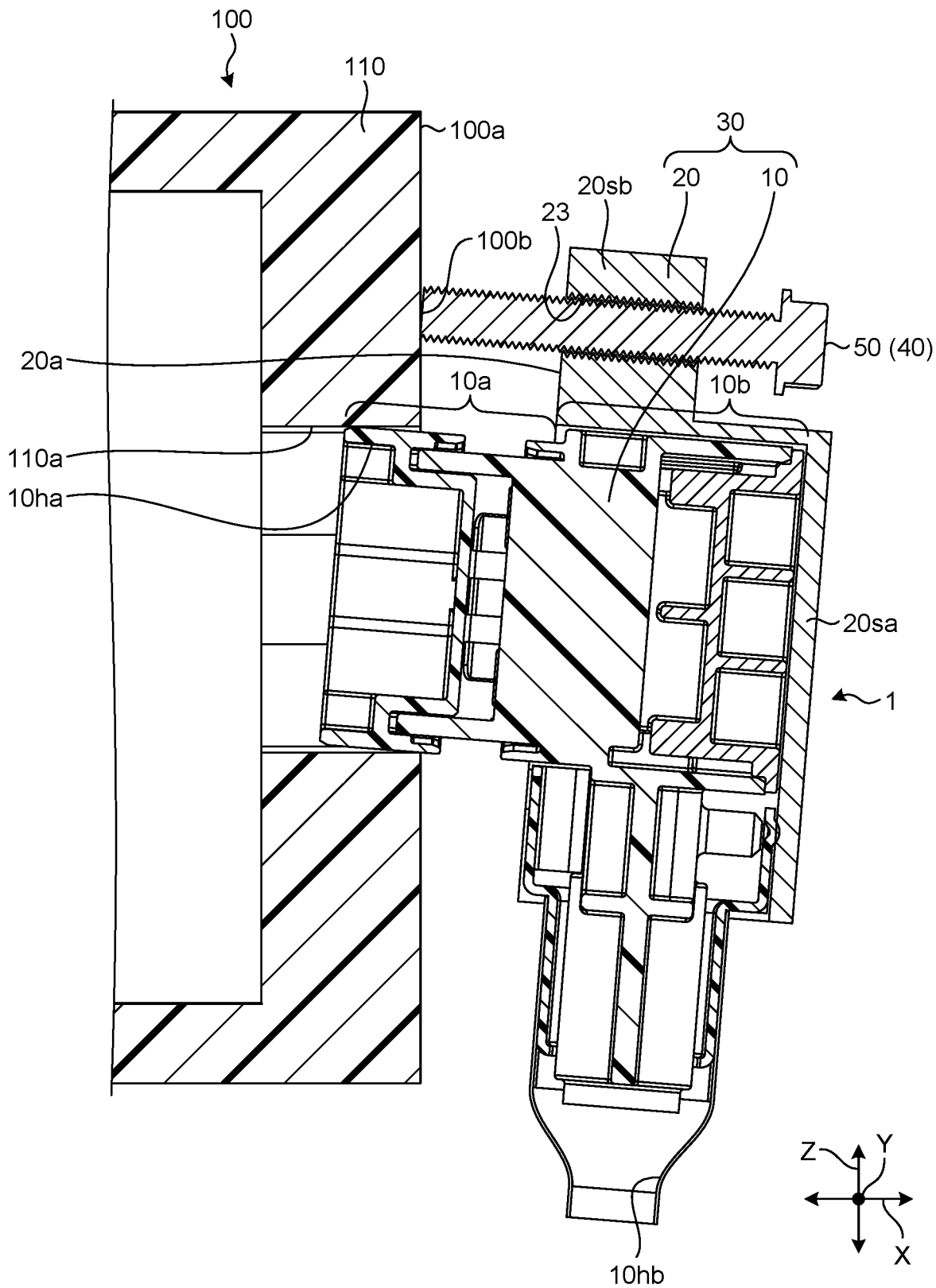
FIG. 6 is a sectional view illustrating the connector according to the embodiment.

With reference to FIG. 1 to FIG. 6, an embodiment will be described. The present embodiment relates to a connector. FIG. 1 is a perspective view illustrating a connector according to the embodiment. FIG. 2 is an exploded perspective view illustrating the connector according to the embodiment. FIG. 3 is an exploded perspective view illustrating the connector according to the embodiment. FIG. 4 is a perspective view illustrating the connector according to the embodiment and a counterpart connector. FIG. 5 is a sectional view illustrating the connector according to the embodiment. FIG. 6 is a sectional view illustrating the connector according to the embodiment. FIG. 5 is a section taken along a line V-V illustrated in FIG. 1. FIG. 6 is a sectional view corresponding to FIG. 5.

A connector 1 according to the embodiment is applied to, for example, a wire harness and the like used for a vehicle such as an automobile. The connector 1 according to the embodiment is physically and electrically connected to a counterpart connector 101 to be fitted. Hereinafter, in the specification, a direction in which the connector 1 is inserted into and removed from the counterpart connector 101 is referred to as a "front and rear direction X", a direction perpendicular to the front and rear direction X is referred to as a "width direction Y", and a direction perpendicular to each of the front and rear direction X and the width direction Y is referred to as a "height direction Z". Furthermore, in relation to the connector 1, a side connected to the counterpart connector in the front and rear direction X is referred to as a "front side" and a side opposite to the front side is referred to as a "rear side". Furthermore, a direction from the rear side to the front side is referred to as a "fitting direction" and a direction from the front side to the rear side is referred to as a "separation direction"

The connector 1 is fixed to a fixed wall surface 100a of a counterpart device in a state of being connected to the counterpart connector 101 (see FIG. 4) provided in the counterpart device that is a connection target 100. The connection target 100, for example, is a device such as an inverter, which is mounted on a vehicle. As illustrated in FIG. 1 and FIG. 2, the connector 1 includes a housing member 30 having a fitting part 10a and a fixed part 20sb. In the connector 1, the fitting part 10a is fitted to the counterpart connector 101 and the fixed part 20sb is fixed to the fixed wall surface 100a. The housing member 30 of the present embodiment includes a connector housing 10 and a shield shell 20. That is, the connector 1 of the embodiment is a shield connector. The fitting part 10a is provided in the connector housing 10 and the fixed part 20sb is provided in the shield shell 20. In the present embodiment, a description will be given on the assumption that the connector 1 is a female connector and the counterpart connector 101 is a male connector. The fitting part 10a of the present embodiment is formed as a female fitting part.

As illustrated in FIG. 3, the connector housing 10 is formed in a cylindrical shape to house a terminal TM and an electric wire EW therein. The connector housing 10 of the embodiment extends along the front and rear direction X and the end part of the rear side thereof in the front and rear direction X extends along the height direction Z, so that the connector housing 10 is formed in an approximately L-shaped cylindrical shape as a whole. As illustrated in FIG. 3, the connector housing 10 of the embodiment houses the terminal TM and the electric wire EW therein and holds the terminal TM. The connector housing 10 is formed using a resin material, for example.

More specifically, the connector housing 10 has the fitting part 10a and an electric wire housing part 10b. In the connector housing 10, the fitting part 10a is configured by a front portion of a part extending along the front and rear direction X. In the connector housing 10, the electric wire housing part 10b is configured by both a rear portion of the part extending along the front and rear direction X and a part extending along the height direction Z. In other words, in the connector housing 10, the fitting part 10a is a part formed by protruding from the electric wire housing part 10b, which extends in the height direction Z, to the front side in the front and rear direction X. Inner space parts of the fitting part 10a and the electric wire housing part 10b communicate with each other.

The fitting part 10a is a part that is fitted to the counterpart connector 101 (see FIG. 4). The fitting part 10a of the embodiment is formed in an approximately long cylindrical shape that employs the width direction Y as a long side direction. The fitting part 10a houses and holds the terminal TM therein. Furthermore, the fitting part 10a has an exposed opening 10ha. In the fitting part 10a, the exposed opening 10ha is an opening that employs the front side in the front and rear direction X as an opening direction. The exposed opening 10ha is a terminal insertion hole through which the terminal TM in the fitting part 10a is exposed and into which a counterpart terminal 101a (see FIG. 4) of the counterpart connector 101 provided in the connection target 100 is inserted. The terminal TM is electrically connected to the counterpart terminal 101a inserted into the exposed opening 10ha when the fitting part 10a has been fitted to the counterpart connector 101 (see FIG. 4).

The electric wire housing part 10b is a part into which the electric wire EW is inserted and which houses an end of the electric wire EW. The electric wire housing part 10b has an insertion opening 10hb. The insertion opening 10hb is an opening that employs a lower side in the height direction Z (lower side of the paper surface in FIG. 3) as an opening direction. The insertion opening 10hb is an electric wire insertion hole into which the electric wire EW is inserted. The end of the electric wire EW is housed in the electric wire housing part 10b via the insertion opening 10hb, so that the electric wire EW is electrically connected to the terminal TM in the fitting part 10a.

Each part of the connector housing 10 including the fitting part 10a, the electric wire housing part 10b, and the like may be configured by combining a plurality of members such as a body member, a front holder, an inner housing, and a cover.

The shield shell 20 suppresses the intrusion of external noise to the terminal TM and the electric wire EW housed in the connector housing 10. The shield shell 20 is formed of a conductive material such as a metal material. The shield shell 20 covers and shields a part of the connector housing 10. For example, as the conductive material of the shield shell 20, a conductive material that increases the strength of the shield shell 20 is used, as compared with the material of the connector housing 10.

More specifically, as illustrated in FIG. 3, the shield shell 20 has a wall part 20sa and a fixed part 20sb, which are integrally formed with each other. The wall part 20sa is a part constituting a back plate facing the surface of a rear side of the electric wire housing part 10b in the front and rear direction X. The fixed part 20sb is a part that surrounds a part of the connector housing 10 with respect to a direction intersecting the front and rear direction X and is fixed to the fixed wall surface 100a. The fixed part 20sb is formed in a wall shape to protrude from an edge part of the wall part 20sa to the front side in the front and rear direction X. The fixed part 20sb is formed to surround the electric wire housing part 10b of the connector housing 10 from both sides in the width direction Y and an upper side in the height direction Z (upper side of FIG. 3). The fixed part 20sb includes a flange part 20a in which screw holes 21 (fixing screw holes), through holes 22 (fastening fixing through holes), a screw hole 23 (screw hole for separation work), and the like, which will be described below, are formed at an end part opposite to the wall part 20sa side in the front and rear direction X.

The shield shell 20 is assembled to the connector housing 10 by fixing members 31. The fixing members 31 of the embodiment are fixing bolts. The connector housing 10 is formed with through holes 11 into which the fixing members 31 are inserted. The screw holes 21 (fixing screw holes) are formed in the flange part 20a of the fixed part 20sb of the shield shell 20 so as to communicate with the through holes 11 in the front and rear direction X. The screw holes 21 are opened on the front side in the flange part 20a and are closed on the rear side. In the embodiment, the electric wire housing part 10b has a flange part 12 protruding in a flange shape in the width direction Y. The flange part 12 faces the flange part 20a of the fixed part 20sb in the front and rear direction X. The through holes 11 of the embodiment are formed in the flange part 12. The fixing members 31 are screwed into the screw holes 21 via the through holes 11, so that the shield shell 20 is attached to the connector housing 10.

As illustrated in FIG. 4, the housing member 30 is connected to the connection target 100 in the state in which the shield shell 20 has been attached to the connector housing 10. The connection target 100 of the embodiment includes a casing 110 and the counterpart connector 101 is provided in the casing 110. The casing 110 is formed in a rectangular box shape. In the embodiment, a wall surface of the casing 110 serves as the fixed wall surface 100a. In the casing 110, the fixed wall surface 100a is formed with an attachment hole 110a and fastening holes 110b. The attachment hole 110a allows an internal space of the casing 110 and an external space to communicate with each other. The fitting part 10a of the connector housing 10 is fitted to the counterpart connector 101 via the attachment hole 110a. The attachment hole 110a is formed in the casing 110 with a shape and a size that allow the fitting part 10a to be inserted. The attachment hole 110a of the embodiment is a hole having an approximately long elliptical shape when viewed from the front and rear direction X, and is formed as a hole slightly larger than the fitting part 10a. The fastening holes 110b are formed around the attachment hole 110a. In the embodiment, two fastening holes 110b are formed and are arranged along the width direction Y. The attachment hole 110a is located between the two fastening holes 110b.

Moreover, as illustrated in FIG. 3, the fixed part 20sb of the embodiment has the through holes 22 (fastening fixing through holes) and the screw hole 23 (screw hole for separation work). The through holes 22 and the screw hole 23 are formed in the flange part 20a of the fixed part 20sb. The flange part 20a of the fixed part 20sb faces the fixed wall surface 100a along the front and rear direction X and abuts the fixed wall surface 100a in the state in which the connector 1 has been connected to the connection target 100.

The through holes 22 penetrate the flange part 20a of the fixed part 20sb along the front and rear direction X. The through holes 22 are formed in a cylindrical shape. As illustrated in FIG. 4, two through holes 22 of the embodiment are formed in the fixed part 20sb. The two through holes 22 are formed at positions of the fixed part 20sb, which face the fastening holes 110b, in the state in which the fitting part 10a has been fitted to the counterpart connector 101. The two through holes 22 communicate with the fastening holes 110b along the front and rear direction X (fitting direction), respectively, in the state in which the fitting part 10a has been fitted to the counterpart connector 101.

The housing member 30 is fixed to the connection target 100 by fastening bolts 40. As illustrated in FIG. 2, each of the fastening bolts 40 has a shaft part 41 and a bolt head part 42. The shaft part 41 extends in a columnar shape. The shaft part 41 is formed on the surface thereof with a spiral screw groove (thread) along the extension direction thereof. The bolt head part 42 is a member that is provided at one end of the shaft part 41 and serves as a base part of the fastening bolt 40. That is, the bolt head part 42 is a pedestal part on which the shaft part 41 is vertically installed. The bolt head part 42 is formed as a part having a larger diameter than the shaft part 41. When the fastening bolt 40 is viewed from the extension direction of the shaft part 41, the shape of the bolt head part 42 is a hexagonal shape. The fastening holes 110b is formed on the inner wall surface thereof with a screw groove (thread). The inner wall surface of the through hole 22 is formed with no screw groove and is formed as a smooth inner wall surface that is substantially even. The fastening bolts 40 are inserted into the through holes 22 along the fitting direction from the rear side of the housing member 30. The fastening bolts 40 inserted into the through holes 22 are screwed into the fastening holes 110b. The fastening bolts 40 are screwed into the fastening holes 110b, so that the fastening bolts 40 are fastened to the fastening holes 110b. As a consequence, as illustrated in FIG. 1, the housing member 30 is fixed to the fixed wall surface 100a of the connection target 100. With such a configuration, the fixed part 20sb is fixed to the fixed wall surface 100a together with the fitting part 10a in the state in which the fitting part 10a has been fitted to the counterpart connector 101. More specifically, the shield shell 20 interposes the connector housing 10 between the fixed wall surface 100a and the shield shell 20 with respect to the front and rear direction X, so that the housing member 30 is fixed to the fixed wall surface 100a together with the connector housing 10.

The screw hole 23 is a hole into which a separation member 50 (separation fastening member) used when the housing member 30 is separated from the fixed wall surface 100a is screwed. The screw hole 23 of the embodiment penetrates the flange part 20a of the fixed part 20sb along the front and rear direction X. As illustrated in FIG. 5, in the state in which the fitting part 10a has been fitted to the counterpart connector 101, a part of the fixed wall surface 100a facing the screw hole 23 in the front and rear direction X serves as a closed surface 100b that closes an opening on the front side of the screw hole 23. The screw hole 23 is formed in a portion of the flange part 20a, which is located on an upper side of the electric wire housing part 10b in the height direction Z. The screw hole 23 is formed on the inner wall surface thereof with a screw groove (thread). In the present embodiment, the fastening bolt 40 removed from the fastening hole 110b is used as the separation member 50. That is, in the present embodiment, the separation member 50 is also used as the fastening bolt 40. The screw hole 23 can be formed to be screwed with the fastening bolt 40 also used as the separation member 50. That is, the size of the screw hole 23, the shape of the screw groove, and the like are formed to correspond to the fastening bolt 40.

In the connector 1 configured as described above, when the housing member 30 is separated from the connection target 100, the fastening bolts 40 are first removed from the fastening holes 110b and the through holes 22. Thereafter, in the connector 1, the removed fastening bolt 40 is used as the separation member 50 and is screwed into the screw hole 23 along the fitting direction from the rear side of the housing member 30. The fastening bolt 40 advances in the screw hole 23 along the fitting direction and abuts the closed surface 100b. Then, as illustrated in FIG. 6, the fastening bolt 40 (separation member 50) is further screwed into the screw hole 23 to abut the closed surface 100b. Then, the fastening bolt 40 is further screwed in the state of abutting the closed surface 100b, so that the housing member 30 is separated from the fixed wall surface 100a in the separation direction. As a consequence, the connector 1 is separated from the counterpart connector 101. That is, the connector 1 of the present embodiment is separated from the connection target 100 by axial force that acts on the fixed wall surface 100a from the fastening bolt 40 (separation member 50) screwed into the screw hole 23.

The length of the screw hole 23 in the front and rear direction X is set in consideration of the strength of the fixed part 20sb, time required for screwing the separation member 50 to abut the fixed wall surface 100a as described above, and the like. For example, by shortening the length of the screw hole 23 in the front and rear direction X, it is possible to shorten the time until the fastening bolt 40 as the separation member 50 reaches the closed surface 100b. On the other hand, by increasing the length of the screw hole 23, it is possible to improve the strength of the fixed part 20sb at the time of separation work of the connector 1.

In the present embodiment, as illustrated in FIG. 2, the thickness of a part of the flange part 20a of the fixed part 20sb, in which the screw hole 23 is formed, in the front and rear direction X is formed to be thinner than that of a part of the fixed part 20sb, in which the through hole 22 is formed. With such a configuration, the length of the screw hole 23 in the front and rear direction X is set to be shorter than that of the through hole 22 in the front and rear direction X. In the screw hole 23, the screw groove may also be formed only in a part of the inner wall surface of the screw hole 23. With such a configuration, it is possible to shorten the time until the fastening bolt 40 reaches the closed surface 100b while holding the strength of the fixed part 20sb.

As described above, the connector 1 according to the present embodiment includes the housing member 30 having the fitting part 10a that houses the terminal TM and is fitted to the counterpart connector 101 provided in the connection target 100 and the fixed part 20sb that is fixed to the fixed wall surface 100a of the connection target 100 together with the fitting part 10a in the state in which the fitting part 10a has been fitted to the counterpart connector 101, and the fixed part 20sb has the through holes 22, which communicate with the fastening holes 110b formed in the fixed wall surface 100a along the fitting direction between the fitting part 10a and the counterpart connector 101 and into which the fastening bolts 40 fastened to the fastening holes 110b are inserted along the fitting direction, in the state in which the fitting part 10a has been fitted to the counterpart connector 101, and the screw hole 23 into which the separation member 50 is screwed.

In the connector 1 according to the present embodiment, the fixed part 20sb has the screw hole 23 into which the separation member 50 is screwed. When the fitting part 10a is separated from the counterpart connector 101, separation force is applied to the fitting part 10a and the fixed part 20sb via the separation member 50 screwed into the screw hole 23. With such a configuration, the connector 1 of the embodiment has an effect that it is possible to easily separate the connectors from each other.

For example, in a configuration in which the terminal TM is provided with a spring as a contact point with a counterpart terminal, a load applied to the contact point by the spring may be designed to increase in order to reduce sliding wear between the terminals. In such a configuration, there is a case where fitting force between the connector and the counterpart connector increases and separation force required for separating the connector from the counterpart connector increases. Even in such a case, in the present embodiment, since separation force is applied via the separation member 50, the connector can be easily separated from the counterpart connector as compared with a case where the connector is directly separated from the counterpart connector by a human hand, for example.

Furthermore, in the connector 1 according to the present embodiment, the screw hole 23 penetrates the fixed part 20sb along the fitting direction and faces the closed surface 100b of the fixed wall surface 100a along the fitting direction, and the separation member 50 is fitted into the screw hole 23 and abuts the closed surface 100b, so that the housing member 30 is separated from the fixed wall surface 100a in the separation direction along the fitting direction.

In the connector 1 according to the present embodiment, the housing member 30 is separated from the fixed wall surface 100a in the separation direction by the axial force of the separation member 50 fitted into the screw hole 23 and abutting the closed surface 100b. As a consequence, the connector 1 uses the axial force of the separation member 50 as separation force for separating the housing member 30 from the counterpart connector, so that it is possible to apply large separation force as compared with a case where separation force is applied by a human hand, for example.

Furthermore, in the connector 1 according to the present embodiment, the screw hole 23 can be screwed with the fastening bolt 40. With such a configuration, the fastening bolt 40 used for fixing the housing member 30 to the fixed wall surface 100a can also be used as the separation member 50. That is, the fastening bolt 40 can also be used as the separation member 50. With such a configuration, for example, any dedicated member for separating the fitting part 10a from the counterpart connector 101 is not required. Consequently, it is possible to reduce the number of parts of the connector 1. Furthermore, it is possible to improve the versatility of the fastening bolt 40.

Furthermore, in the connector 1 according to the present embodiment, the housing member 30 includes the connector housing 10 that is formed of a resin material and holds the terminal TM, and the shield shell 20 that is formed of a metal material and is assembled to the connector housing 10, the fitting part 10a is provided in the connector housing 10, and the fixed part 20sb is provided in the shield shell 20.

In the connector 1 according to the present embodiment, the fixed part 20sb is provided in the shield shell 20 formed of a metal material, so that it is possible to ensure the strength of the fixed part 20sb.

Modification Example of Embodiment

Figure 7:
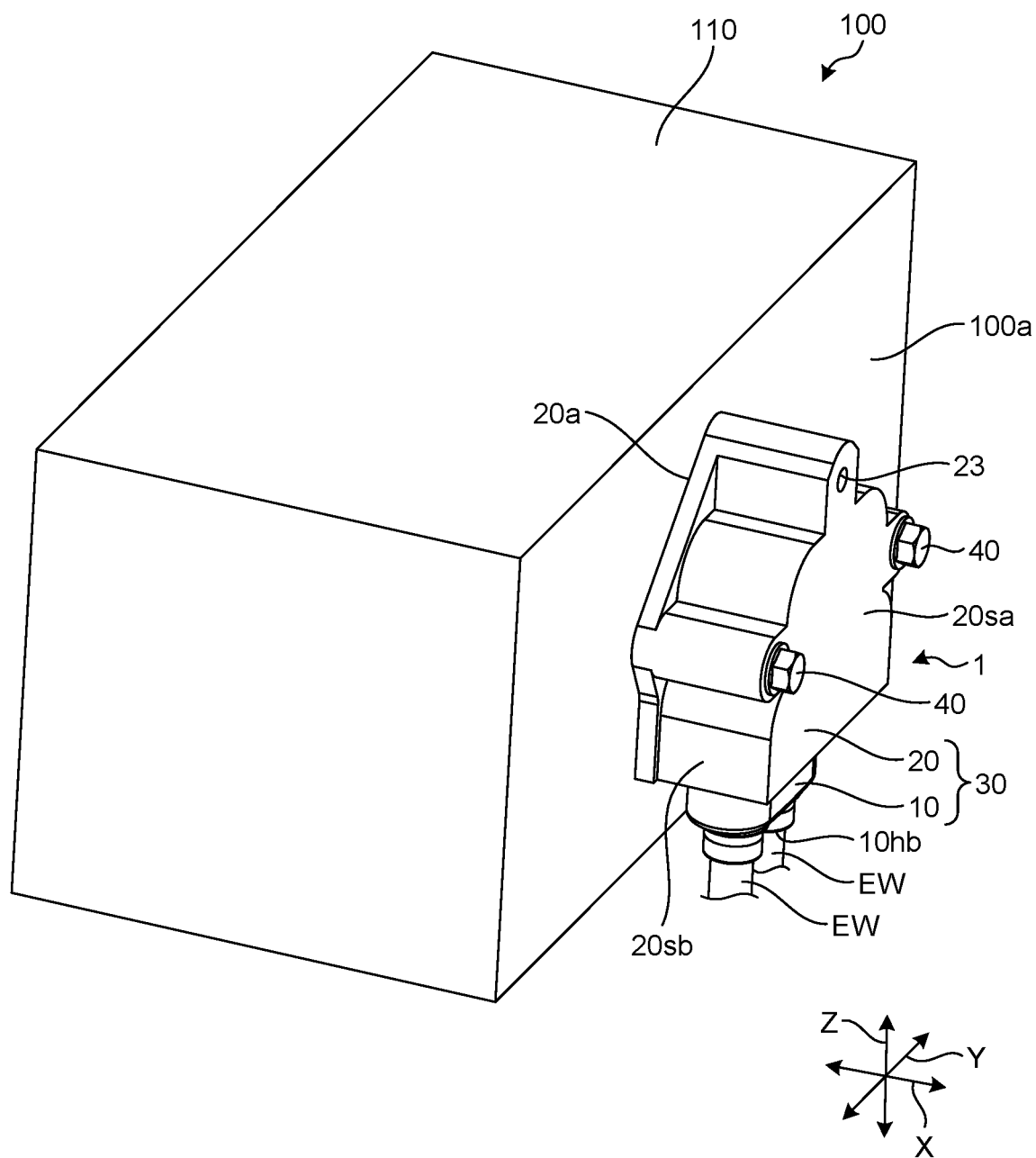
FIG. 7 is a perspective view illustrating a connector according to a modification example of the embodiment.
Figure 8:
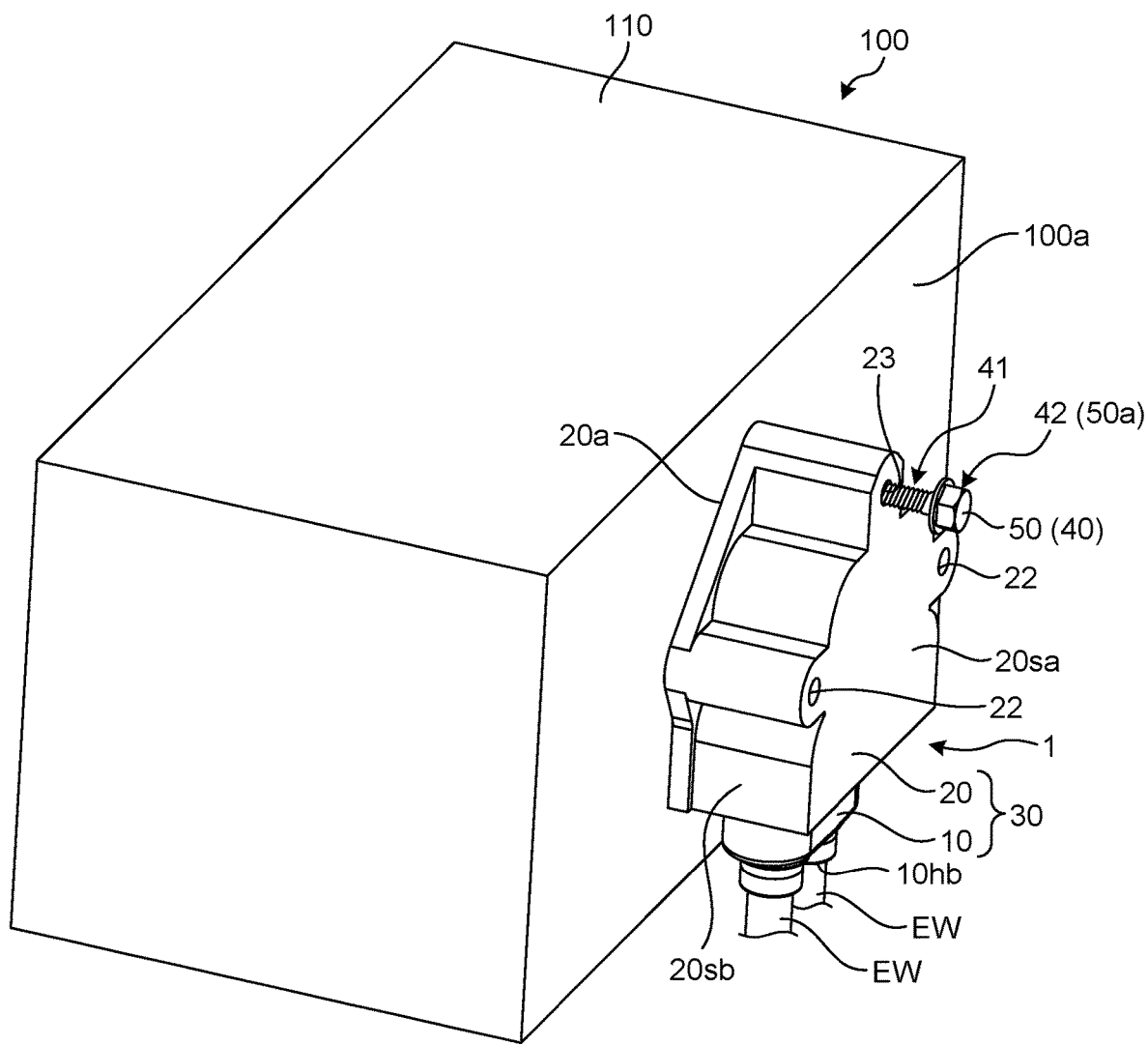
FIG. 8 is a perspective view illustrating the connector according to the modification example of the embodiment.
Figure 9:
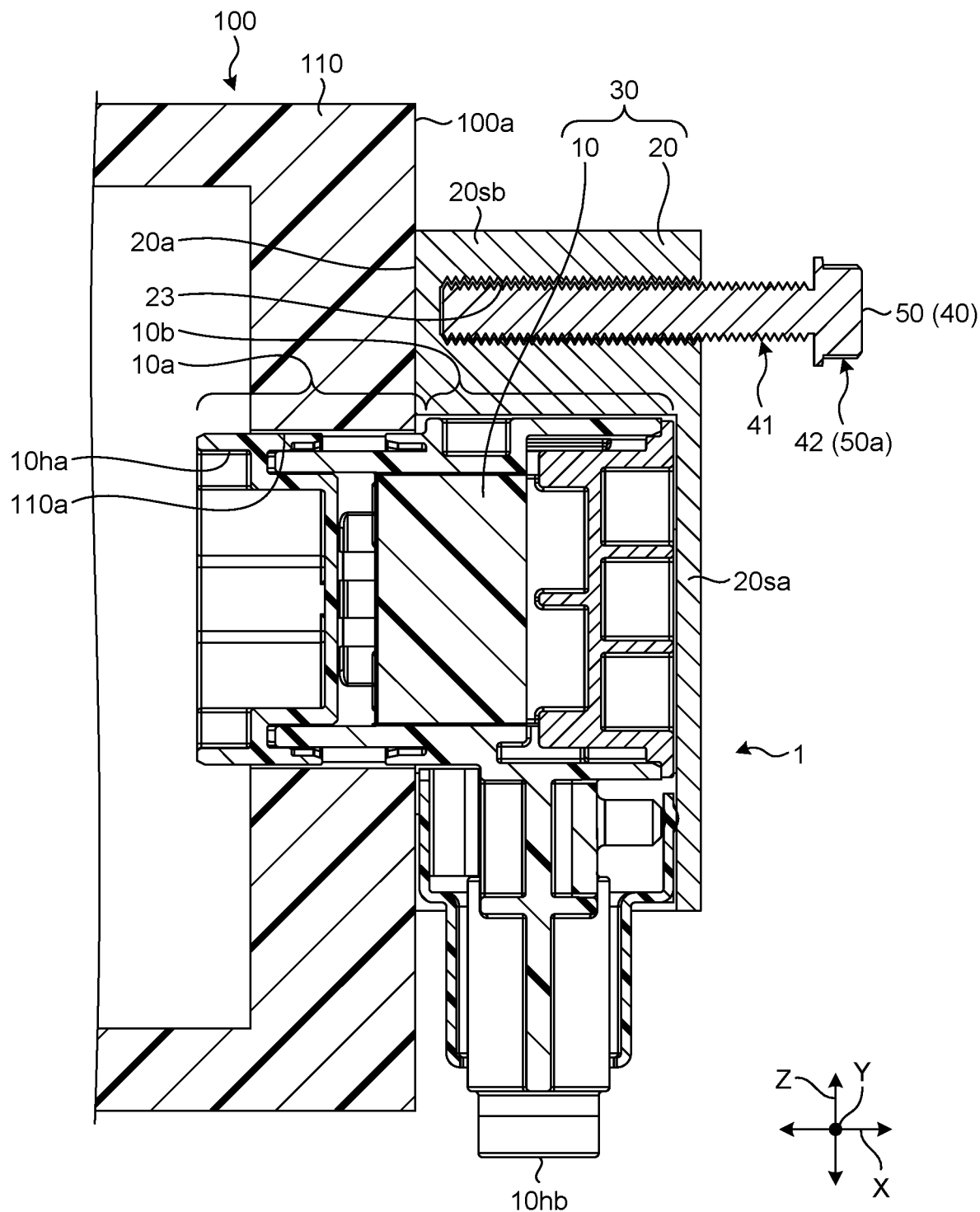
FIG. 9 is a sectional view illustrating the connector according to the modification example of the embodiment.
Figure 10:
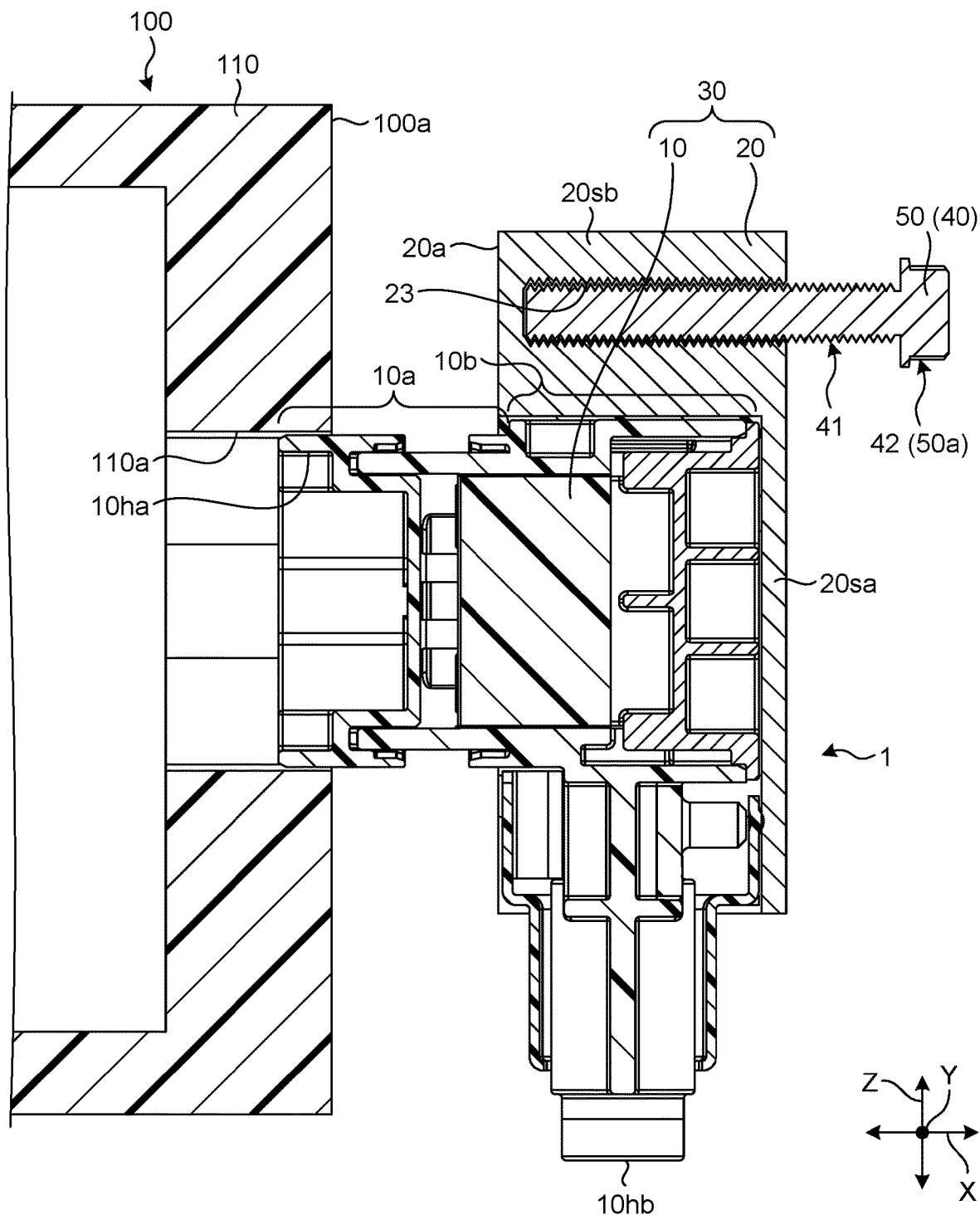
FIG. 10 is a sectional view illustrating the connector according to the modification example of the embodiment.

With reference to FIG. 7 to FIG. 10, a modification example of the embodiment will be described. The modification example of the embodiment relates to a connector. In the modification example of the embodiment, constituent elements having functions similar to those described in the aforementioned embodiment are denoted by the same reference numerals and a redundant description thereof will be omitted. FIG. 7 is a perspective view illustrating the connector according to the modification example of the embodiment. FIG. 8 is a perspective view illustrating the connector according to the modification example of the embodiment. FIG. 9 is a sectional view illustrating the connector according to the modification example of the embodiment. FIG. 10 is a sectional view illustrating the connector according to the modification example of the embodiment. FIG. 9 is a sectional view corresponding to FIG. 5. FIG. 10 is a sectional view corresponding to FIG. 6.

A connector 1 according to the modification example is different from the connector 1 according to the aforementioned embodiment in terms of the configuration of the screw hole 23. As illustrated in FIG. 7, in the connector 1 according to the modification example, a part of the flange part 20a of the fixed part 20sb, in which the screw hole 23 is formed, in the front and rear direction X is formed with substantially the same thickness as that of a part of the fixed part 20sb, in which the through hole 22 is formed. When the housing member 30 is separated from the connection target 100, the fastening bolts 40 are first removed from the through holes 22 and the fastening holes 110b. Thereafter, as illustrated in FIG. 8, the fastening bolt 40 as the separation member 50 is inserted into the screw hole 23.

As illustrated in FIG. 9, in the fixed part 20sb of the modification example, the screw hole 23 is closed on the front side in the front and rear direction X and is opened on the rear side in the front and rear direction X. That is, a side of the screw hole 23 of the modification example, which faces the fixed wall surface 100a, is closed with respect to the fitting direction. In a state in which the fastening bolt 40 (separation member 50) has been fitted into the screw hole 23, a part on the bolt head part 42 side of the bolt head part 42 and the shaft part 41 is exposed from the screw hole 23. In the modification example, the bolt head part 42 is used as a hook part 50a of the separation member 50. That is, in the connector 1 according to the modification example, in the state in which the separation member 50 has been fitted into the screw hole 23, the separation member 50 has the hook part 50a at an end part that is located on a side opposite to the fixed wall surface 100a side in the fitting direction and exposed from the screw hole 23. The hook part 50a, for example, serves as a part for hooking a jig and the like for separating the housing member 30 from the connection target 100. Furthermore, the hook part 50a may also be used as a grip part that is gripped by a human hand and pulled along the separation direction.

So far, as described above, in the connector 1 according to the modification example, a side of the screw hole 23, which faces the fixed wall surface 100a, is closed with respect to the fitting direction, and in the state in which the separation member 50 has been fitted into the screw hole 23, the separation member 50 has the hook part 50a at an end part that is located on a side opposite to the fixed wall surface 100a side in the fitting direction and exposed from the screw hole 23.

In the connector 1 according to the modification example, the hook part 50a can be used as a part for hooking a jig and the like for separating the housing member 30 from the connection target 100. Furthermore, the hook part 50a can also be used as a grip part that is gripped by a human hand and pulled along the separation direction. With such a configuration, the connector 1 according to the modification example has an effect that it is possible to easily separate the connectors from each other.

In the aforementioned modification example, a part of the fixed wall surface 100a, which faces the screw hole 23 in the front and rear direction X, may not be the closed surface 100b.

Furthermore, the aforementioned modification example has been described using an example in which a side of the screw hole 23, which faces the fixed wall surface 100a, is closed with respect to the fitting direction. However, the screw hole 23 may also penetrate the fixed part 20sb in the fitting direction similarly to the aforementioned embodiment.

The connectors 1 according to the aforementioned embodiment and modification example of the present invention are not limited to the aforementioned embodiment and modification example, and various modifications can be made within the scope of the claims.

For example, in the aforementioned embodiment and modification example, the configuration in which the screw hole 23 can be screwed with the fastening bolt 40 has been described as an example. However, the configuration of the screw hole 23 is not limited thereto. For example, the screw hole 23 is not able to be screwed with the fastening bolt 40 and may have a shape in which a dedicated member used for separating the fitting part 10a from the counterpart connector 101 can be fitted.

Furthermore, in the aforementioned embodiment and modification example, the configuration in which the housing member 30 includes the connector housing 10 and the shield shell 20 and the fixed part 20sb is provided in the shield shell 20 has been described as an example. However, the configuration of the housing member 30 is not limited thereto. For example, the housing member 30 may also be formed as an integrated housing member formed of resin. That is, the fixed part 20sb may also be provided in the housing member formed of resin. Furthermore, a material for forming the connector housing 10 is not limited to the resin material. Furthermore, the housing member 30 may have a resinous mounting member instead of the metallic shield shell 20 and the mounting member may also be provided with a fixed part. In such a case, the through holes 22, the screw hole 23, and the like may also be configured by a metal collar and the like provided at the fixed part of the mounting member.

Furthermore, the aforementioned embodiment and modification example have been described using an example in which the connector housing 10 viewed from the width direction Y has an L shape. However, the shape of the connector housing 10 is not limited thereto. For example, the shape of the connector housing 10 may be a cylindrical shape extending along the front and rear direction X. In such a case, the shield shell 20, for example, is formed as a cylindrical member that covers the electric wire housing part 10b of the connector housing 10 from the outside.

The contents disclosed in the aforementioned embodiment and modification example can be implemented by an appropriate combination.

In the connector according to the present embodiment, the fixed part has the screw hole into which the separation member is screwed. When the fitting part is separated from the counterpart connector, separation force is applied to the fitting part and the fixed part via the separation member screwed into the screw hole. With such a configuration, in accordance with the connector according to the present embodiment, there is an effect that it is possible to easily separate the connectors from each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:
a housing member having a fitting part that houses a terminal and is fitted to a counterpart connector provided in a connection target and a fixed part that is fixed to a fixed wall surface of the connection target together with the fitting part in a state in which the fitting part has been fitted to the counterpart connector, wherein
the fixed part has through holes, that communicate with fastening holes formed in the fixed wall surface along a fitting direction between the fitting part and the counterpart connector and into which fastening bolts fastened to the fastening holes are inserted along the fitting direction, in the state in which the fitting part has been fitted to the counterpart connector, and a screw hole into which a separation member is screwed,
the housing member includes a connector housing that is formed of a resin material and holds the terminal, and a shield shell that is formed of a metal material and is assembled to the connector housing,
the fitting part is provided in the connector housing, and the fixed part is provided in the shield shell.

2. The connector according to claim 1, wherein
the screw hole penetrates the fixed part along the fitting direction and faces a closed surface of the fixed wall surface along the fitting direction, and
the separation member is fitted into the screw hole and abuts the closed surface, so that the housing member is separated from the fixed wall surface in a separation direction along the fitting direction.

3. The connector according to claim 1, wherein
a side of the screw hole, that faces the fixed wall surface, is closed with respect to the fitting direction, and
in a state in which the separation member has been fitted into the screw hole, the separation member has a hook part at an end part that is located on a side opposite to a side of the fixed wall surface in the fitting direction and exposed from the screw hole.

4. The connector according to claim 1, wherein
the screw hole is able to be screwed with the fastening bolt.

5. The connector according to claim 2, wherein
the screw hole is able to be screwed with the fastening bolt.

6. The connector according to claim 3, wherein
the screw hole is able to be screwed with the fastening bolt.

7. A connector comprising:
a housing member having a fitting part that houses a terminal and is fitted to a counterpart connector provided in a connection target and a fixed part that is fixed to a fixed wall surface of the connection target together with the fitting part in a state in which the fitting part has been fitted to the counterpart connector, wherein the fixed part has through holes, that communicate with fastening holes formed in the fixed wall surface along a fitting direction between the fitting part and the counterpart connector and into which fastening bolts fastened to the fastening holes are inserted along the fitting direction, in the state in which the fitting part has been fitted to the counterpart connector, and a screw hole into which a separation member is screwed, a side of the screw hole, that faces the fixed wall surface, is closed with respect to the fitting direction, and in a state in which the separation member has been fitted into the screw hole, the separation member has a hook part at an end part that is located on a side opposite to a side of the fixed wall surface in the fitting direction and exposed from the screw hole.

* * * * *